(No Model.)
N. BRENNAN.
CORN HUSKING MACHINE.
No. 434,654. Patented Aug. 19, 1890.
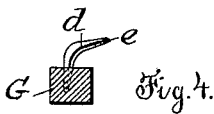
Fig. 4.
Fig. 5.
Fig. 6.
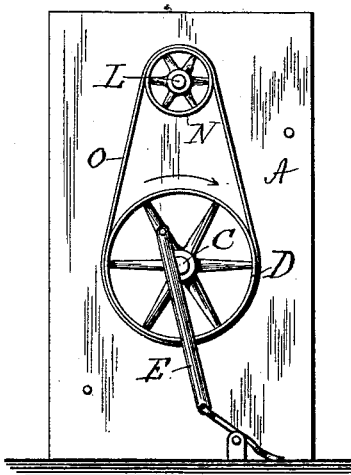
Fig. 3.
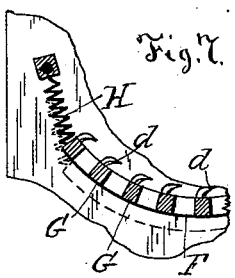
Fig. 7.
Fig. 1. Fig. 2.
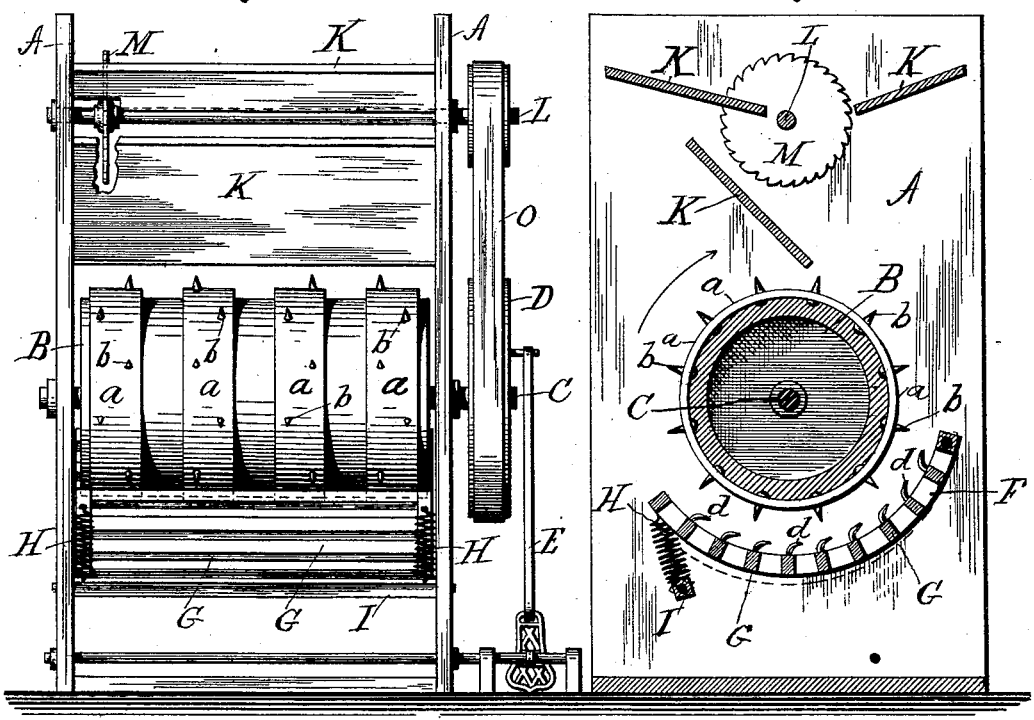
Witnesses
A. D. Hanison.
W. C. Ramsay.
Inventor
N. Brennan
By his Attorneys
Wright Brown & Crosby

UNITED STATES PATENT OFFICE.

NICHOLAS BRENNAN, OF EAST BOSTON, MASSACHUSETTS, ASSIGNOR OF ONE-HALF TO LEROY P. LAWRENCE, OF SAME PLACE.

CORN-HUSKING MACHINE.

SPECIFICATION forming part of Letters Patent No. 434,654, dated August 19, 1890.

Application filed October 7, 1889. Serial No. 326,253. (No model.)

*To all whom it may concern:*

Be it known that I, NICHOLAS BRENNAN, of East Boston, in the county of Suffolk and State of Massachusetts, have invented certain new and useful Improvements in Corn-Husking Machines, of which the following is a specification.

My invention relates to corn-husking machines; and it consists, generally, of a revolving drum or cylinder with teeth or pins projecting from the periphery of the same, in combination with a yielding concave supported below said cylinder, having openings through the same, and having upwardly-projecting pins; and my improvements consist, also, in certain other features and details of construction, as more particularly hereinafter described, and pointed out in the claim.

In the accompanying drawings, Figure 1 illustrates a rear elevation of my improved machine. Fig. 2 is a transverse vertical section of the same. Fig. 3 is a side elevation. Figs. 4 and 5 are details. Fig. 6 is a detail representing in plan a little different form of tooth from those shown in the yielding receptacle in the other figures. Fig. 7 is a modification.

The same letters of reference indicate the same parts in all of the figures.

A A are the two vertical standards of the frame of the machine, and B is a cylinder or drum journaled horizontally in said standards. The cylinder or drum B is provided with peripheral flanges $a$, from which extend teeth or pins $b$. One journal C of the drum B supports a wheel D outside of the standard, and eccentrically pivoted to said wheel is a pedal attachment E.

F is a concave pivoted in the standards A A, near one of its edges or sides in front of the cylinder B, and with its concave portion under said cylinder. The concave F is made with openings through it, preferably in the manner shown in the drawings, which is of longitudinal slats or bars G at slight distances apart. The free side of the concave F is connected by coil-springs H H to the standards A A, or to a transverse rod I, extending from one standard to the other. Projecting upward from the slats G, and extending backward from the same, or toward the pivot of the concave F, are teeth $d$. These teeth have broad free edges $e$, extending in a direction longitudinally with the drum B and concave F.

Above the drum B, and extending between the standards A A, are inclined boards or slats K K K, forming a hopper for guiding the falling unhusked ears of corn onto the drum B toward the front of the machine or in the direction in which said drum should be revolved.

When the drum B is rotated from back to front, or as illustrated by the arrows in Figs. 2 and 3, and the unhusked ears are dropped onto the slats K, said ears will fall upon the drum B and be carried by said drum between it and the concave F, when the pins $a$ and teeth $d$, coming into play against the husks of the ears, with the springs H H forcing the teeth $d$ against said husks, the latter will hold back the ears, and the teeth $a$ continuing to revolve in a direction against the edges $e$ of the teeth will tear the husks off from the ears, and the latter will drop down between the slats. The broad edges $e$ of the teeth $d$ serve to effectually hold the ears while the husks are being torn off by the pin $a$, and avoid tearing of the ear itself and the grain, which sharp-pointed teeth on the concave F would do. The springs H H serve not only to bear the concave F and its supporting-ears upward toward the drum B, but also to give a yielding quality to the hanger to accommodate its position relatively to the drum to different sizes of ears. The dotted lines in Fig. 2 illustrate the position the concave F will assume when forced down against the action of the springs H H by large-sized ears.

If desired, a cornstalk-cutter for removing the stalk before the ear is husked may be used in combination with the above-described devices. To accomplish this purpose a shaft L is supported in the standards A A above the drum B, and on this shaft, between said standards, is secured a circular or buzz saw M. To the end of the shaft L, above the wheel D, is keyed a pulley N, and this pulley is connected with the wheel D by an endless belt O. It will thus be seen that when the drum B is revolved the saw M will also revolve, and the cornstalks can therefore be sawed off and the husking accomplished at the same operation.

The springs H may, if desired, be fixedly connected above the hanger F with the lower end of said spring attached to the hanger (see Fig. 7) in place of the construction shown in Figs. 1, 2, and 3.

What I claim as new, and desire to secure by Letters Patent, is—

In a corn-husking machine, the combination of the drum having series of teeth thereon, the concave pivotally secured at one side, the springs supporting the other side of said concave, the teeth d, secured to the upper surface of the concave and having right-angular flattened ends, substantially as set forth.

In testimony whereof I have signed my name to this specification, in the presence of two subscribing witnesses, this 28th day of September, A. D. 1889.

NICHOLAS BRENNAN.

Witnesses:
C. F. BROWN,
A. D. HARRISON.